Oct. 2, 1956     L. BONO     2,764,895
DEVICE FOR CONVERTING OSCILLATORY MOTION INTO VARIABLE
AMPLITUDE INTERMITTENT UNIDIRECTIONAL MOVEMENT
Filed Nov. 19, 1954     2 Sheets-Sheet 1
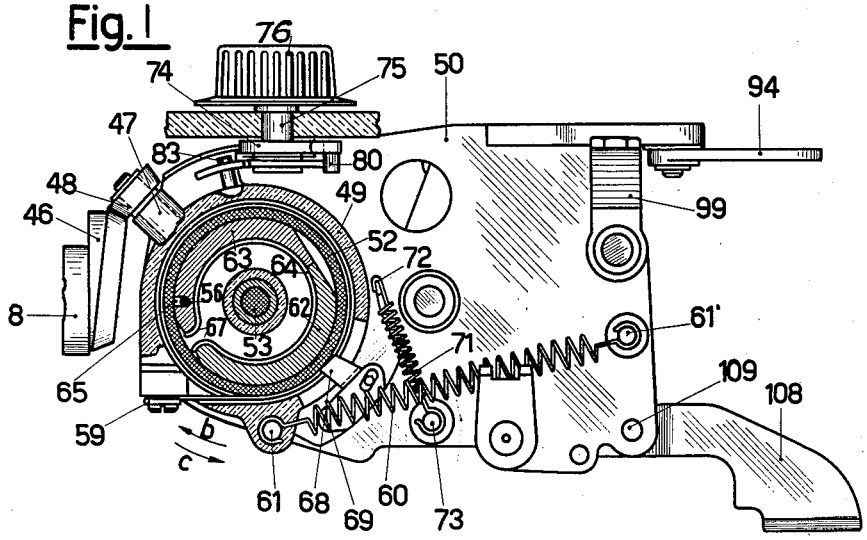
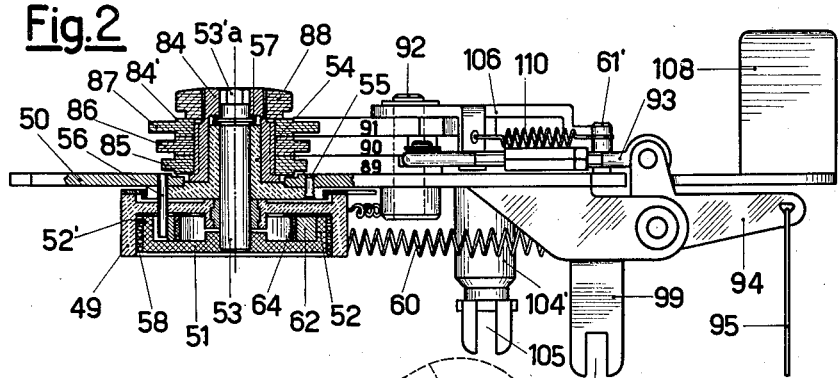
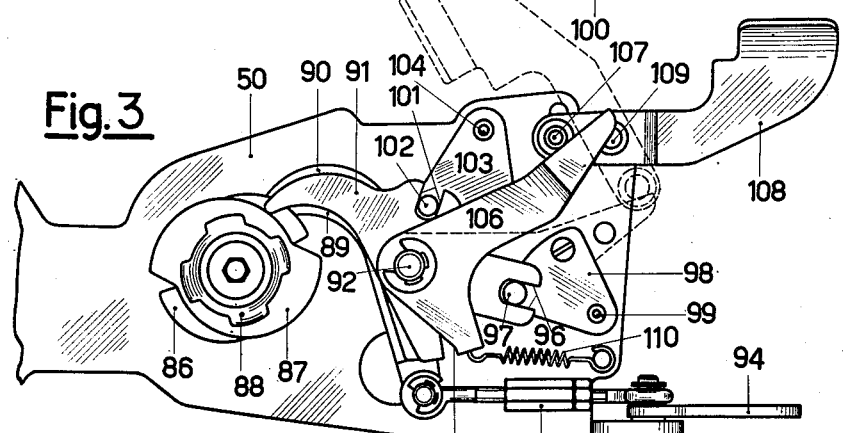
INVENTOR.
LUIGI BONO
BY Wenderoth, Lind
& Ponack
attys.

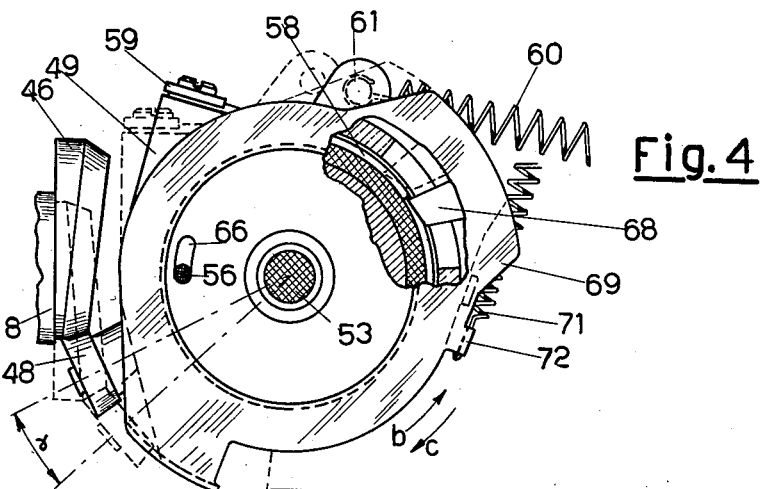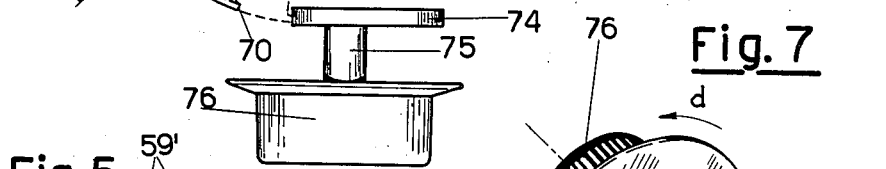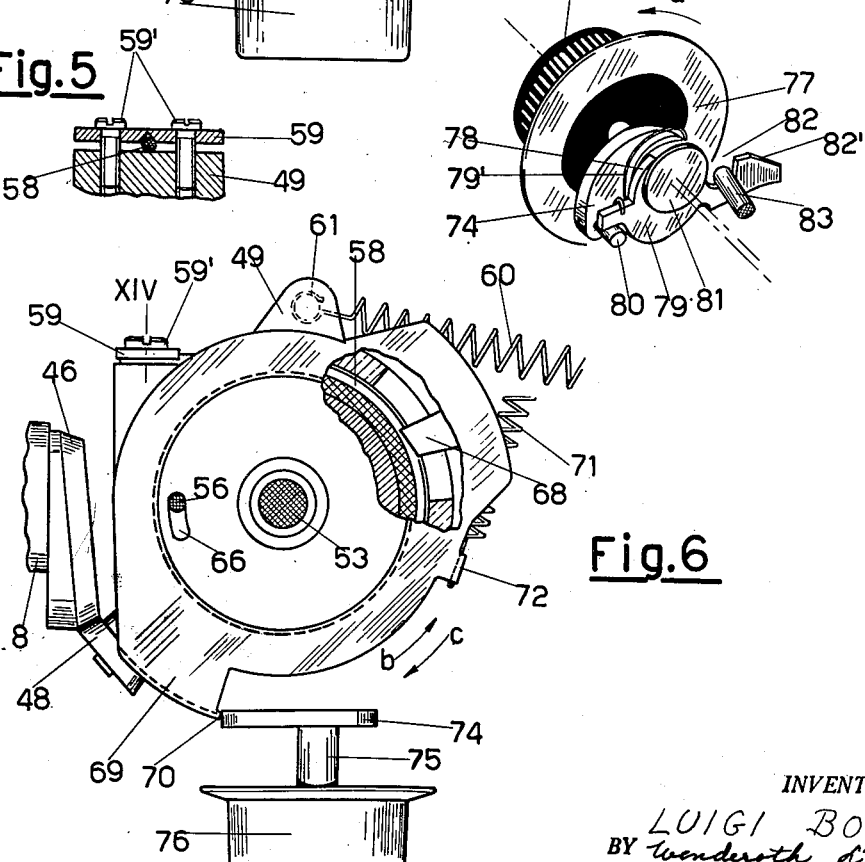

United States Patent Office 2,764,895
Patented Oct. 2, 1956

2,764,895

DEVICE FOR CONVERTING OSCILLATORY MOTION INTO VARIABLE AMPLITUDE INTERMITTENT UNIDIRECTIONAL MOVEMENT

Luigi Bono, Pavia, Italy, assignor to Vittorio Necchi Societa per Azioni, Pavia, Italy Application November 19, 1954, Serial No. 470,115

Claims priority, application Italy October 27, 1954

7 Claims. (Cl. 74—148)

The present invention relates to an improved clutch and brake device of general utility.

An object of the invention is to transform the continuous rotary motion of one shaft into an intermittent rotary motion of another element.

A further object of the invention is to provide means for the braking of the intermittent motion of such element.

A further object of the invention is to provide adjusting means for adjusting the rotation angles of the element intermittently driven and for disengaging such brake means.

With the above and other objects in view, a detailed description of a preferred modification is given below with respect to the accompanying drawings in which:

Figure 1 is an elevational view with parts in section of the clutch and brake device;

Figure 2 is a sectional view taken at right angles to that shown in Figure 1 with parts in section;

Figure 3 is a lateral view of the elements for providing the intermittent motion to a shaft, and Figures 4, 5, 6 and 7 illustrate details in the device.

In the various views similar reference characters indicate like parts.

A shaft 8 which may be driven continuously in any desired way has a conical cam 46 fixed thereto. The cam 46 during its rotation moves the pin 47 in an oscillatory movement. A roll 48 mounted upon one end of the pin 47 contacts the profile of the cam 46. The pin 47 is fixed to a drum 49 located below a plate 50 and is maintained by a disc 51 provided with a flange 52, the upper edge of which is gently in contact with the internal portion of the drum 49.

A shaft 53 is welded to the disc 51 and passes through the drum 49. The shaft 53 is free to rotate around its axis within its bushing 54 which is fixed to the plate 50 by means of the rivets 55 and the pin 56.

A washer 57 is fixed to the shaft 53 and bears upon the bushing 54 and maintains the shaft and the disc 51 in proper position so that the drum 49 which is sustained by the flange 52 and pressed against such flange and the lower part of the bushing 54 is free to rotate around the shaft 53. A helical spring 58 is tightly wound upon the flange 52 and is contained with a slight play by the drum 49. One end of the spring 58 is fixed to the drum 49 by means of a cross bar 59 and secured thereto by the two screws 59′ as seen in Figure 5.

The other end of the spring 58 is freely wound upon the flange 52.

The roll 48 is maintained in constant contact with the cam 46 during its oscillatory movement around the axis of the shaft 53 by means of a spring 60 which has one end connected to a pin 61 fixed to the drum 49 and the other end connected to a pin 61′ mounted upon the lower face of the plate 50.

The mechanisms above described serve to transform the continuous rotary movement of the shaft 8 into an intermittent rotary movement of the shaft 53. When the roll 48 and consequently also the drum 49 connected thereto rotates in the direction of the arrow $b$ the spring 58, because of its special winding, tightly binds the flange 52 of the disc 51 and rotates it. However, when the roll 48 moves in the opposite direction as shown by the arrow $c$ the spring which is fixed to the drum 49 at one of its ends relaxes and the disc is no longer rotated and therefore the shaft 53 is also not rotated.

A proper braking device has also been provided which acts at the inside of the flange 52. This is composed of two shoes 62 and 63 which are maintained tightly against the flange by the spring 64. The shoe 63 has an opening 65 in which the pin 56 is positioned which is tightly fixed to the plate 50 and passes through the arc shaped opening 66 located in the bottom of the drum 49. Therefore when the drum 49 rotates in the direction of the arrow $c$ when the spring 58 does not move the disc 51 external forces applied to the shaft 53 will not be able to place it in rotation due to the frictional contacts upon the flange 52 by the above described brake.

However, when the drum 49 is rotating in the direction of the arrow $b$ thereby rotating the disc 51, the pin 56 reacts on the brake shoes in such a manner that both ends of the spring 64 are drawn closer to one another thereby reducing the friction of the shoes on the flange 52. Such a reduction in friction is necessary in order to facilitate the movement of the disc 51 in the direction of the arrow $b$.

The angle which includes the arc shaped opening 66 having as a center the axis $a$ is equal to or larger than the oscillation angle of the roll 48.

In the above-described device each oscillation of the drum 49 which is determined by a complete revolution of the shaft 8 there corresponds an intermittent rotation with constant amplitude of the disc 51 and therefore of the shaft 53 fixed thereto. In other words, while the disc 53 makes one revolution with equal intermittent impulses the shaft 8 makes a number of revolutions equal to the number of said impulses.

It is sometimes useful to change the amplitude of the impulses of the disc 51 from zero to a maximum equal to the oscillation constant amplitude of the drum 49. If a force acts on the free end of the spring 58 during the rotation of the drum 49 in the direction of the arrow $b$ then the spring 58 is prevented by such force from clinging to the disc 51 and putting it into rotation. Therefore the apparatus has been provided with a tooth 68 which is the element for reacting on the free end of the spring 58. The tooth 68 is fixed to the plate 69 which is free to rotate around the lower part of the bushing 54 and has an extension 70.

A spring 71 has one end thereof attached to an extension 72 upon the plate 69 and the other end is fixed to a pin 73 fixed to the plate 50. The spring 71 urges the tooth 68 in the direction of the arrow $b$.

A cam 74 which is fixed to a shaft 75 may be manually controlled by means of a knob 76. The cam 74 in accordance with its adjusted position can come into contact with the extension 70 upon the plate 69 thereby regulating the oscillation angles of the plate 69 during the oscillatory movement with constant amplitude of the drum 49.

In fact (Figure 4) at the beginning of the stroke in the direction of the arrow $b$ of the drum 49, the free end of the spring 58 is pressed by the tooth 68 under the action of the spring 71 and the extension 70 is displaced from the cam 74 by an angle equal to or greater than that of the oscillation of the drum 49.

Therefore during the entire stroke in the direction of the arrow $b$ while the end of the spring 58 is also displaced in the direction of the arrow $b$ the tooth 68 is forced to make the same movement exerting constantly a force against the free end of the spring 58. Therefore the cam 74 when placed in this position, during this entire stroke of the drum 49, allows the tooth 68 to follow the rotation of the spring 58 which is a necessary condition in order to prevent the disc 51 from being rotated.

However, when the knob 76 is rotated for 180° in order to bring the maximum radius of the cam 74 into contact with the extension 70 (Figure 6), during the movement of the drum 49, the tooth 68 can not exercise any pressure upon the end of the spring 58 and therefore the disc 51 will be intermittently rotated through arcs of the maximum amplitude.

Also, when the cam 74 is placed in a middle position between the position shown in Figures 4 and 6, during the stroke in the direction of the arrow $b$, first the extension 70 rotates and the tooth 68 presses against the spring 58. The disc 51 therefore is not rotated. Afterwards, when the extension 70 is stopped by the cam 74 then from this point onwards to the end of the stroke in the direction of the arrow $b$ the tooth 68 is motionless and the spring 58 will rotate the disc 51.

Therefore by giving the cam 74 any position between that shown in Figure 4 and Figure 6 the disc 51 will rotate intermittently through arcs of increasing amplitude from zero to a maximum.

Whenever it is desired to detach the device completely from the movement of the shaft 8 it is necessary to operate the knob 76 which is connected to a device for disconnecting the roll 48 from the cam 46.

An element 77 is embraced by a clevis 78 which is a part of the piece 79 is eccentrically fixed to the rotation axis of the cam 74. The pin 80 fixed to the cam 74 supports the piece 79 around the element 77 while the plate 81 holds it in the axial direction. A spiral spring 79' has one end fixed to the cam 74 and the other end to the piece 79 with such a winding that the piece 79 is urged to rotate in the direction of the arrow $d$ against the pin 80.

Therefore, while the cam 74 is in the non-dragging position as shown in Figure 4, the opening 82 of the piece 79 is in a horizontal position. Then the pin 83 which is fixed to the drum 49 during the stroke in the direction of the arrow $b$, glides on the slanting surface of the piece 79 and lowers it slightly. When it comes into correspondence with the opening 82 the piece 79 urged by the spring 79' rotates in the direction of the arrow $d$ until it is stopped by the pin 80.

In this position, Figure 7, the pin 83 is blocked by the opening 82 and it can not make, together with the drum 49, the normal oscillations. Afterwards the knob 76 must be rotated through a certain angle in the direction of the arrow $d$ in such a manner that the eccentrical element 77 displaces the piece 79 and also the pin 83 removes any contact between the roll 48 and the cam 46.

The end 53' of the shaft 53 must then be coupled with the bushing 84 which rotates intermittently around the shaft 53. The bushing 84 is provided with two radial extensions 84' in its lower position and is threaded in its upper portion. Three cams 85, 86 and 87 are mounted on the bushing 88 and are maintained thereon by the threaded nut 88 screwed upon the threaded portion of the bushing 84.

The free ends of the levers 89, 90 and 91 are respectively in contact with the cams 85, 86 and 87. The levers 89, 90 and 91 are fulcrumed upon the pin 92 fixed to the plate 50. The lever 89 which is operated by the cam 85 is connected by the tierod 93 with the right angular lever 94. A rod 95 is connected to the lever 94 and the rod 95 may be manipulated from any desired mechanism in order to maintain a constant contact between the lever 89 and the cam 85.

The lever 90 which is controlled by the cam 86 is provided with a notch 96 which embraces a pin 97 mounted on the plate 98. The plate 98 is fixed to a shaft 99 having a curved arm provided with a notch 100.

The lever 90 when oscillated about the pin 92 rotates the plate 98 and the plate 98 causes the shaft 99 to rotate about its axis.

The notch 100 may engage any mechanism such as in a sewing machine the zigzag width-adjusting mechanism.

The lever 91 which cooperates with the cam 87 is provided with a notch 101 in which the pin 102 is engaged. The pin 102 is mounted upon the plate 103 which is fixed to the shaft 104 which in turn terminates with a curved side having a notch 105 therein. The lever 91 when rotated around the pin 92 moves the plate 103 and the shaft 104 rotates inside the coupling box 104' fixed to the plate 50.

The notch 105 at the end of the shaft 104 when the device is utilized with a sewing machine, may be connected to the needle shifting elements.

The two armed lever 106 which is also fulcrumed on the pin 92 has one arm in contact with the pin 107 mounted upon the lever 108 which is fulcrumed upon the pin 109. Upon manually displacing the lever 108 from the full line position shown in Figure 3 to the dotted line position, the pin 107 causes the lever 106 to rotate so that the bent end 106' thereof will cause the three levers 89, 90 and 91 to rotate towards the right as shown in Figure 3 thereby breaking contact of such levers with the respective cams 85, 86 and 87.

The above device is useful in order to remove the three cams easily from the bushing 84 in order to substitute others therefor. Also their positions may be manually changed or the coupling angles may be changed.

When the lever 108 is returned to its original position the lever 106 is withdrawn by the spring 110 thereby allowing the levers 89, 90 and 91 to again come into contact with their respective cams. This contact of the levers is insured by the springs, not shown.

It is thought that the invention and its advantages will be understood from the foregoing description and it is apparent that various changes may be made in the process, form, construction and arrangement of the parts without departing from the spirit and scope of the invention or sacrificing its material advantages, the form hereinbefore described and illustrated in the drawings being merely a preferred embodiment thereof.

What I claim is:

1. A device for converting oscillatory motion into variable amplitude intermittent unidirectional movement comprising a shaft, a first piece fixed to said shaft, a helical spring elastically surrounding said piece, a member causing one end of said spring to oscillate periodically around the axis of said shaft, a second piece freely supported coaxially with said shaft, an adjustable stop, said second piece having a first extension adapted to abut the other end of said spring and a second extension adapted to abut said stop and elastic means urging said second piece to rotate to exert a pressure on said other end of said spring during a portion of the clutching stroke controlled by said stop.

2. A device as set forth in claim 1 wherein friction means are provided connected to a fixed part for braking said first piece.

3. A device as set forth in claim 1 wherein said member causing one end of said spring to oscillate periodically is pivoted coaxially with said shaft.

4. A device as set forth in claim 1 wherein said adjustable stop comprises a cam, a knob for actuating said cam manually and said second extension abuts said cam.

5. A device as set forth in claim 1 wherein an element is connected to said adjustable stop and said element blocks the oscillatory movement of said member during a portion of the clutching stroke.

6. A device as set forth in claim 2 wherein an element is connected to said adjustable stop and said element blocks the oscillatory movement of said member during a portion of the clutching stroke.

7. A device as set forth in claim 5 wherein a pin is provided upon said member and a hook is elastically supported by said cam for engaging said pin.

References Cited in the file of this patent

UNITED STATES PATENTS 1,833,831    Drawz ---------------- Nov. 24, 1931

FOREIGN PATENTS 259,132    Germany -------------- Apr. 25, 1913
872,060    France --------------- Jan. 29, 1942